(12) United States Patent
Skaare et al.

(10) Patent No.: US 11,754,045 B2
(45) Date of Patent: Sep. 12, 2023

(54) BLADE PITCH CONTROLLER FOR A WIND TURBINE

(71) Applicant: EQUINOR ENERGY AS, Stavanager (NO)

(72) Inventors: Bjørn Skaare, Trondheim (NO); Emil Smilden, Kolsås (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 17/756,973

(22) PCT Filed: Nov. 18, 2020

(86) PCT No.: PCT/NO2020/050284
§ 371 (c)(1),
(2) Date: Jun. 7, 2022

(87) PCT Pub. No.: WO2021/118361
PCT Pub. Date: Jun. 17, 2021

(65) Prior Publication Data
US 2023/0025543 A1     Jan. 26, 2023

(30) Foreign Application Priority Data
Dec. 13, 2019  (GB) .................... 1918423

(51) Int. Cl.
  *F03D 7/02*  (2006.01)
  *F03D 13/25*  (2016.01)
  *F03D 7/04*  (2006.01)

(52) U.S. Cl.
  CPC ......... *F03D 7/0296* (2013.01); *F03D 7/0224* (2013.01); *F03D 7/046* (2013.01); *F03D 13/25* (2016.05); *F05B 2240/95* (2013.01); *F05B 2270/328* (2013.01); *F05B 2270/342* (2020.08)

(58) Field of Classification Search
  CPC ........ F03D 7/0224; F03D 7/0296; F03D 7/04; F05B 2270/342
  See application file for complete search history.

(56) References Cited

U.S. PATENT DOCUMENTS 10,907,617 B2 *   2/2021   Caponetti .............. F03D 7/047
2011/0204636 A1 * 8/2011   Scholte-Wassink ........ F03D 7/0296
                                                              290/44

FOREIGN PATENT DOCUMENTS

| GB | 2466649 A | 7/2010 |
| GB | 2590388 B | 6/2021 |
| WO | 2008/081232 A1 | 7/2008 |

(Continued)

OTHER PUBLICATIONS

International Search Report and Written Opinion for PCT/EP2020/050284, dated Feb. 24, 2021 (7 pp.).

(Continued)

*Primary Examiner* — Aaron R Eastman
(74) *Attorney, Agent, or Firm* — Eversheds Sutherland (US) LLP

(57) ABSTRACT

A blade pitch controller for a wind turbine includes a nominal control system and a tower feedback loop. The tower feedback loop includes a filtering system. The filtering system is arranged to control wind turbine blade pitch so as to provide additional effective stiffness to the wind turbine in response to motion of the wind turbine which is above a filter frequency of the filtering system.

19 Claims, 5 Drawing Sheets

(56) References Cited

FOREIGN PATENT DOCUMENTS

| WO | 2015/085465 A1 | 6/2015 | | |
|---|---|---|---|---|
| WO | 2016/004950 A1 | 1/2016 | | |
| WO | WO-2018007011 A1 * | 1/2018 | ........... | F03D 7/0224 |
| WO | 2018/033190 A1 | 2/2018 | | |
| WO | 2018/101833 A1 | 6/2018 | | |
| WO | 2018/145710 A1 | 8/2018 | | |
| WO | 2018/210390 A1 | 11/2018 | | |
| WO | 2019/214786 A1 | 11/2019 | | |

OTHER PUBLICATIONS

Search Report, GB1918423.3, dated Apr. 22, 2020 (3 pp.).
Bossanyi, E.A., Wind Turbine Control for Load Reduction, Wind Energ. 2003, 6:229-244 (DOI: 10.1002/we.95) (16 pp.).
Smilden, E., et al., Wave disturbance rejection for monopile offshore wind turbines, Wileyonlinelibrarycom/journal/we, DOI: 10.1002/we.2273, Aug. 17, 2018 (20 pp.).
Van Der Hooft, E.L., et al., Wind turbine control algorithms, DOWEC-F1W1-EH-02-094/0, Dec. 2003 (89 pp.).
Office Action, JP 2022-535522 (English translation), dated May 16, 2023 (8 pp.).

* cited by examiner

BLADE PITCH CONTROLLER FOR A WIND TURBINE

TECHNICAL FIELD

The present invention relates to the field of rotor blade pitch control for wind turbines. More specifically, it relates to rotor blade pitch control for fixed foundation offshore wind turbines.

BACKGROUND OF THE INVENTION

A schematic diagram showing an example of a typical fixed foundation offshore wind turbine is shown in FIG. 1. As shown in this figure, a fixed foundation offshore wind turbine 1 typically comprises an elongate tower 5, with a nacelle 4 and a rotor 2 attached to the upper end of the tower 5. The generator and its associated electronics are usually located in the nacelle 4. The rotor 2 comprises a plurality of (e.g. two or three) blades 3. The wind turbine 1 is fixed, via a foundation 6 which is connected to the lower end of the tower 5, to the seabed 7 in an offshore location.

In this context, it should be understood that "offshore" simply means that the foundation of the wind turbine is surrounded by water. This could be, and typically is, sea water, for example.

It is known to control the pitch of the rotor blades in order to improve performance in wind turbines. For example, blade pitch may be controlled to optimise power output. However, blade pitch may also be controlled for other reasons, such as to reduce vibrations.

Methods of using collective blade pitch control (i.e. controlling all the rotor blades together by the same amount) to increase the aerodynamic damping of the fore-aft bending modes of fixed foundation offshore wind turbines are well known in the wind energy industry. Increased aerodynamic damping results in reduced fatigue damage in both the tower and the foundation(s) for fixed foundation offshore wind turbines. Such control methods are discussed in Van der Hooft, 2003 and Bossanyi, 2003 (see list of references below). However, these methods are only efficient in a narrow frequency range around the first fore-aft modal frequency.

More recently, it is also known to use collective blade pitch control to increase the stiffness, as well as the aerodynamic damping, of the fore-aft vibration modes of fixed foundation offshore wind turbines. Such a method is discussed in Smilden, 2018.

This method is based on a blade pitch controller comprising a tower feedback loop consisting of a state estimator and a reference model, which both use low fidelity models of the wind turbine system, with the purpose of dividing or separating the wind and wave induced motions, and providing stiffness based on the wave induced part of the motion, and providing damping based on the overall velocity of the tower.

The main advantages of the increased stiffness are that the first bending frequency is moved further away from the wave excitation frequencies, and that it achieves a wider frequency range of effectiveness than from providing only increased damping. This is believed to be of greater importance for large offshore wind turbines (6-10 MW and beyond, for example) where wave loads often dominate in terms of fatigue utilisation. The largest improvement compared to controllers providing increased damping only was found at high sea states.

The control method disclosed in Smilden, 2018 shows excellent performance with respect to fatigue. However, it is a relatively complex control system, with several low fidelity models implemented in a state estimator and a reference model. This method is also dependent on a mean wind speed measurement, which may be challenging to achieve sufficiently accurately.

Thus, there is a need for an improved blade pitch control method for fixed foundation offshore wind turbines.

SUMMARY OF THE INVENTION

According to a first aspect of the invention, there is provided a blade pitch controller for a wind turbine, the blade pitch controller comprising a nominal control system and a tower feedback loop, wherein the tower feedback loop comprises a filtering system, and the tower feedback loop is arranged to control wind turbine blade pitch so as to provide additional effective stiffness to the wind turbine in response to motion of the wind turbine above a filter frequency of the filtering system.

Thus, the invention provides a blade pitch controller which adjusts the blade pitch so as to provide effective stiffness to the wind turbine in response to motion of the wind turbine above a filter frequency of the filtering system. Providing additional effective stiffness to the wind turbine in response to, e.g. all measured dynamic, motion of the tower above a filter frequency, means that such damping may be applied in response to both wave- and wind-induced motion.

The term "effective stiffness" refers to the fact that the mechanical stiffness of the wind turbine tower is of course unaltered but by adjusting the blade pitch, the dynamic stiffness properties of the wind turbine are altered such that the wind turbine effectively acts as if it is stiffer.

A wind turbine will oscillate according to the following equation for damped harmonic motion:

$$\text{mass} \times \text{acceleration} + \text{damping constant} \times \text{velocity} + \text{stiffness constant} \times \text{displacement} = 0$$

Adjusting the blade pitch may adjust the damping constant and/or the stiffness constant in this equation.

Using a filtering system allows the effective stiffness of the wind turbine to be increased only in response to motion of the wind turbine which is above a filter frequency of the filtering system, in a relatively simple way. In other words, this mechanism of providing increased stiffness can be applied selectively only in response to wind turbine motion which is above a certain frequency. For example, in some embodiments the filter frequency may be (or be around) $2\pi/25$ rad/s. The filter frequency is preferably below the wave frequency range, which is usually around 0.2-0.05 Hz.

An object of at least the preferred embodiments of the invention is to provide a simplified collective blade pitch control scheme to increase damping and stiffness of the fore-aft bending modes, e.g. for fixed foundation offshore wind turbines.

The present invention provides a great simplification over the system presented in Smilden, 2018. The inventors achieved this by realising that providing additional effective stiffness to a wind turbine can be achieved with simple filtering, for example of available position and/or velocity measurements/estimates (as described in more detail below), instead of with the state estimator (and its associated complex modelling), reference model, and measurement of mean wind speed as required in the Smilden, 2018 system. Thus, unlike the Smilden, 2018 system, the present invention does not (necessarily) require the use or presence of a state estimator, reference model and measurement of mean wind.

Use of a simple filtering system, as in the present invention, may ensure that there is no steady state error on the rotor speed control loop (as achieved by use of state estimator and reference models in the Smilden, 2018 system). Furthermore, the present invention may provide effective stiffness to all dynamic motion of the wind turbine above the filter frequency of the filtering system and preferably also within the bandwidth of a blade pitch actuator. In contrast to this, the Smilden, 2018 system provided stiffness only to the wave-induced part of the dynamic motions.

As the tower feedback loop may operate to provide additional effective stiffness to all measured dynamic motion of the tower above a filter frequency of the filtering system and beneath the bandwidth of the blade pitch mechanism, this may exclude any influence due to, for example, a wind turbine tower bending due to a steady wind or gentle changes in the wind (zero or low frequency) but may act on motion caused by the relatively high frequency of waves hitting the tower.

The tower feedback loop is preferably arranged to control wind turbine blade pitch so as to provide additional effective stiffness and damping to the wind turbine in response to both wave- and wind-induced motion of the wind turbine.

Thus, this controller may be particularly useful where there is both wave and wind-induced motion of the wind turbine. As such, the wind turbine is preferably an offshore wind turbine.

The wind turbine may be a fixed foundation wind turbine.

The tower feedback loop is preferably arranged to control the blade pitch of the wind turbine to reduce or minimise tower oscillations.

In contrast to this, the nominal control system is preferably arranged to control the blade pitch of the wind turbine in order to optimise power production.

The filtering system may comprise one or more filters, for example as described below. In some cases, the filtering system may comprise two or three filters. The one or more filters may comprise one or more of a high-pass filter, a low-pass filter and a notch filter. These are described in more detail below.

The filtering system preferably comprises a high-pass filter. This may be used to filter out wind turbine motion which is below a filter frequency of the high-pass filter. The filter frequency of the filtering system referred to above may thus (and preferably does) correspond to the filter frequency of a high-pass filter.

The tower feedback loop is preferably arranged to control wind turbine blade pitch so as to provide additional effective stiffness and damping to the wind turbine in response to motion of the wind turbine which is within a bandwidth of a blade pitch actuator. A time constant for the blade pitch actuator may vary with turbine model and size. However, a typical range could be around 0.2-2 seconds.

Position and/or velocity measurements or estimates of the wind turbine are preferably provided as input to the filtering system. In some cases, both position and velocity measurements or estimates may be provided as input. In other cases, only one kind, for example position measurements or estimates, may be provided as input. For example, it may not be required or desirably to filter velocity measurements or estimates. This is because the damping effect associated with the velocity measurement could in principle react to all motions within the bandwidth of the blade pitch actuator as it does not contain a static value. Since there is typically no (or an insignificant) steady-state component in the velocity signal, a high-pass filter may not be required. It is preferable, but not necessary, to use a low-pass filter for filtering out high frequent noise.

The position and/or velocity measurements or estimates may be provided from direct measurements or they could be calculated based on position, velocity and/or acceleration measurements.

The position and/or velocity measurements or estimates may be provided from one or more (motion) sensors located on the wind turbine, and preferably located on a tower, platform deck or foundation of the wind turbine. Preferably, the one or more sensors are located at or near a water line on the wind turbine.

It can be advantageous to locate such motion sensors near or at the water line (e.g. as opposed to being closer to/at the nacelle). This is because the sensors may then better capture wave-induced motion and capture less wind-induced noise such as the blade passing frequency effect. The platform deck of an offshore wind turbine may be a practical and advantageous location for such motion sensors. Such selection of sensor location may then advantageously avoid the need to provide filtering of the blade passing frequency (which is described more below).

The filtering system is preferably arranged to output filtered position and/or velocity measurements of the wind turbine. Such measurements may then be used (e.g. in the tower feedback loop) to determine a blade pitch adjustment.

In some cases, where both filtered position and velocity measurements are output from the filtering system, the filtering system is arranged to filter the position and velocity measurements of the wind turbine differently, for example with different filters.

The filtering system is preferably arranged to filter out static and/or quasi-static (e.g. very slow) motion. This may be caused by constant and/or slow changes in wind, for example, resulting in low-frequency wind-induced motion.

Filtering out such static and/or quasi-static motion may be performed with a high-pass filter such as a second order Butterworth high-pass filter. This could use a Laplace transform such as $$h_{fa}(s) = \frac{s^2}{s^2 + \sqrt{2}\,\omega_{fa}s + \omega_{fa}^2}, \tag{1}$$

where $h_{fa}$ is the Laplace transform function, $\omega_{fa}$ is the high pass filter frequency in rad/s and s is the Laplace variable.

In some embodiments, the filtering system is arranged to filter out motion at a blade passing frequency. For example, for a three-bladed wind turbine, the filtering system may be arranged to filter out motion at the 3P frequency. Similarly, for a two-bladed wind turbine, the filtering system may be arranged to filter out motion at the 2P frequency. The 3P frequency could be in the range of 0.2-0.6 Hz, and/or the 2P frequency could be in the range 0.15-0.5 Hz, for example.

As described above, the filtering system may comprise a notch filter. For example, the notch filter may be used to filter out motion at a blade passing frequency. As such, the notch filter may have a notch filter frequency corresponding to the blade passing frequency. The blade passing frequency could potentially change with rotor speed. However, in practice, the wind turbine controller functionality of this invention will typically be activated only above the wind turbine's rated wind speed where the rotor speed (and hence blade passing frequency) is (nearly) constant.

The filtering system may be arranged to filter out noise such as high frequency noise or responses. This could be performed with a low-pass filter, for example (preferably with a sufficiently high filter frequency such as 0.5 Hz). The low-pass filter could be a second order Butterworth low-pass filter.

The tower feedback loop preferably further comprises a feedback controller. The feedback controller is preferably arranged to receive an output from the filtering system and to output a signal to the nominal control system. For example, the feedback controller is preferably arranged to determine and output a blade pitch reference signal (blade pitch adjustment) from output (e.g. filtered position and/or velocity measurements of the wind turbine) from the filtering system. The blade pitch reference signal may be an adjustment (e.g. an angular adjustment) which is added to a nominal blade pitch reference signal provided from a basic controller in the nominal control system.

The blade pitch reference signal $\beta_{TFC}$ output from the feedback controller may be expressed as:

$$\beta_{TFC} = -\frac{1}{F_A^\beta(\omega, \beta)}(K_P^x x_{f1} + K_D^x \dot{x}_{f2}). \quad (2)$$

where $K_P^x$ is a proportional gain, and $K_D^x$ is a derivative gain. $F_A^\beta(\omega,\beta)$ may be implemented as an estimate of the derivative from pitch angle to aerodynamic thrust force:

$$F_A^\beta(\omega, \beta) = \frac{\partial F_A}{\partial \beta}\Big|_{(\omega,\beta)} < 0, \quad (3)$$

where $\omega$ is the rotor speed and $\beta$ is the blade pitch angle. $F_A^\beta(\omega,\beta)$ could typically be implemented as a constant value or a gain scheduling value as a function of blade pitch angle and/or measured rotor speed.

$\chi_{f1}$ is the filtered position measurement/estimate $\chi$ and $\dot{\chi}_{f2}$ is the filtered position measurement/estimate $\dot{\chi}$, where the x direction with respect to the wind turbine is as indicated in FIG. 1.

According to a further aspect of the invention, there is provided a method of controlling blade pitch of a wind turbine, the method comprising using a blade pitch controller with a filtering system to control the blade pitch so as to provide additional effective stiffness to the wind turbine in response to motion of the wind turbine above a filter frequency of the filtering system.

The method preferably comprises using a blade pitch controller as described above (with any of its optional or preferred features).

The method may comprise controlling wind turbine blade pitch so as to provide additional effective stiffness to the wind turbine in response to both wave- and wind-induced motion of the wind turbine.

The method may comprise controlling wind turbine blade pitch so as to provide additional effective stiffness to the wind turbine in response to motion of the wind turbine within a bandwidth of a blade pitch actuator.

The method preferably comprises using the filtering system to filter position and/or velocity measurements and/or estimates of the wind turbine.

The method may comprise: filtering position and velocity measurements and/or estimates of the wind turbine differently; filtering out static and/or quasi-static motion; and/or filtering out motion at a blade passing frequency.

The method preferably comprises determining a blade pitch reference signal from filtered position and/or velocity measurements and/or estimates of the wind turbine.

According to a further aspect of the invention, there is provided a wind turbine comprising a blade pitch controller as described above.

The wind turbine preferably comprises one or more motion sensors as described above.

According to a further aspect of the invention, there is provided a tower feedback controller for a blade pitch controller for a wind turbine, wherein the tower feedback controller comprises a filtering system and the filtering system is arranged to control wind turbine blade pitch so as to provide additional effective stiffness to the wind turbine in response to motion of the wind turbine above a filter frequency of the filtering system. The tower feedback controller, and preferably also its filtering system, is preferably as described above.

BRIEF DESCRIPTION OF THE DRAWINGS

Preferred embodiments of the invention will now be described by way of example only and with reference to the accompanying drawings, in which.

DETAILED DESCRIPTION

Figure 1:
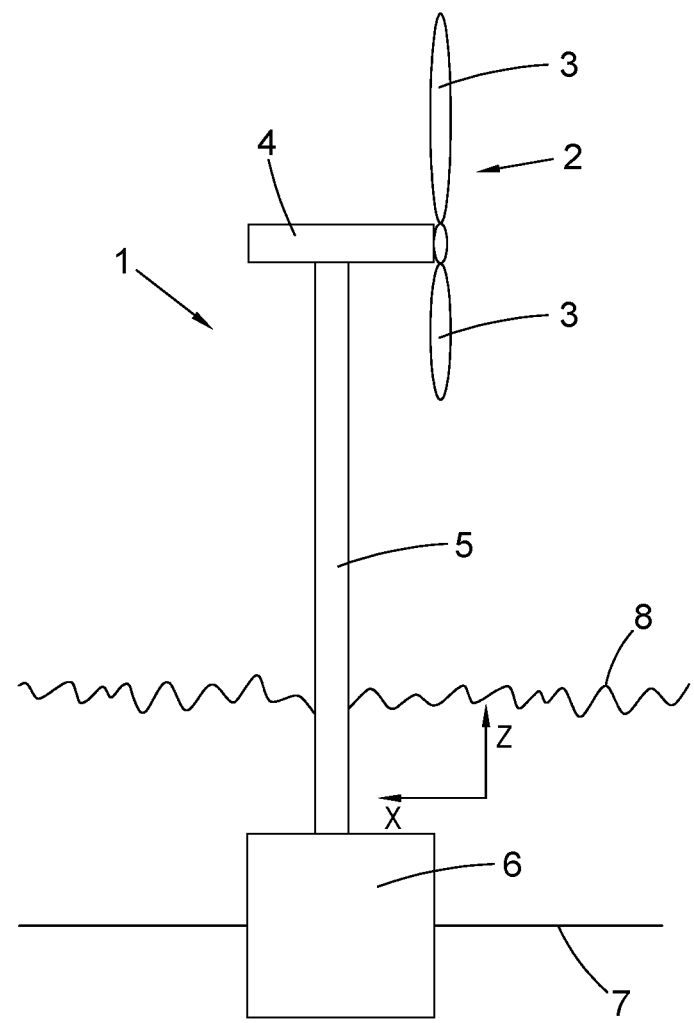
FIG. 1 is a schematic diagram of a typical fixed foundation offshore wind turbine.
Figure 3:
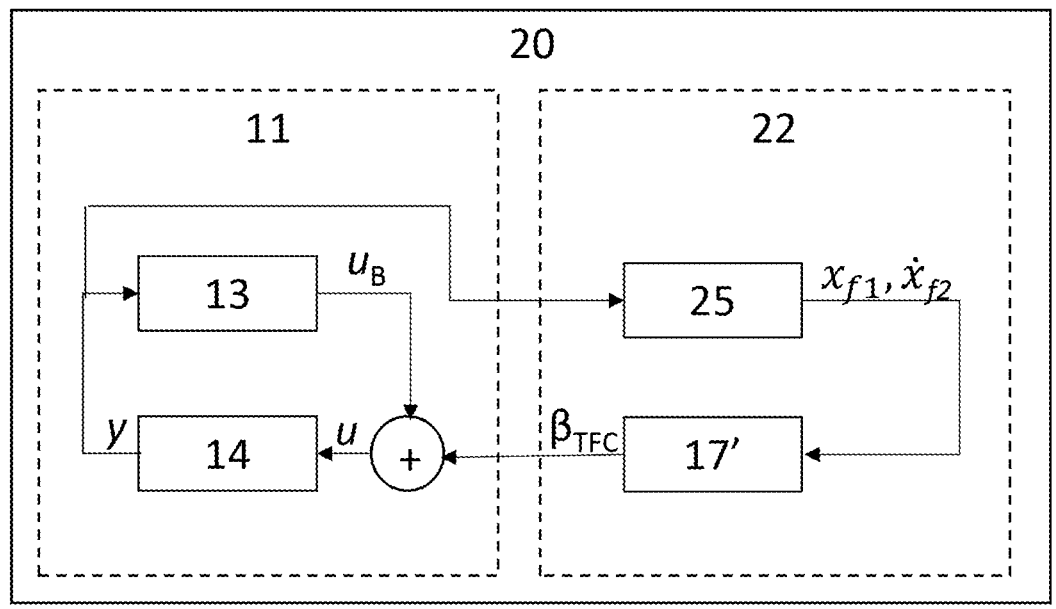
FIG. 3 is a schematic diagram of an embodiment of a blade pitch control system according to the invention.

The present invention relates to a blade pitch controller 20 for a fixed foundation offshore wind turbine 1, as illustrated schematically in FIGS. 3 and 1, respectively.

Figure 2:
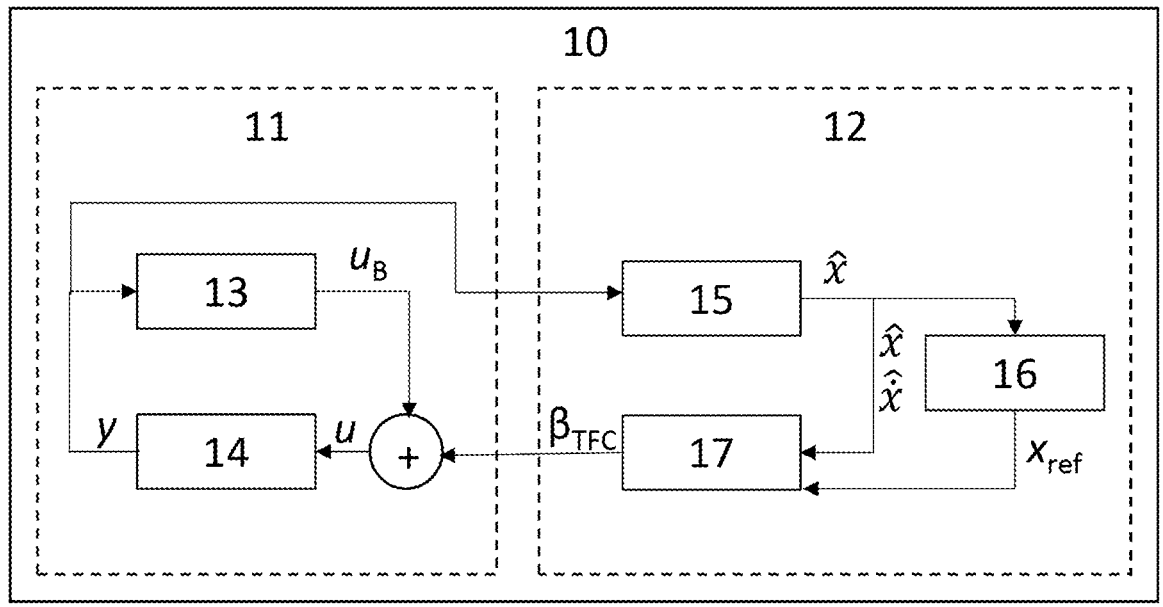
FIG. 2 is a schematic diagram of a known blade pitch control system.

In order to better understand the blade pitch controller 20 of the present invention, it is helpful to first consider a prior art blade pitch controller 10, as illustrated schematically in FIG. 2.

The blade pitch controller 10, which is described in more detail in Smilden, 2018, consists of two parts: a nominal control system 11 and a tower feedback loop 12.

The nominal control system 11 comprises a basic controller 13 which receives signals from and sends signals to an offshore wind turbine 14. The basic controller 13 of the nominal control system 11 adjusts the blade pitch of the wind turbine in order to optimise power production.

The nominal control system 11 is combined with a tower feedback loop 12, which adjusts the blade pitch of the wind turbine to reduce or minimise tower motions.

The tower feedback loop 12 receives measurements (signals) directly from the offshore wind turbine 14. The main objective of the tower feedback loop 12 is to reduce wave-induced fatigue loads in the tower 5. Proportional-derivative collective pitch control is employed to provide the tower 5 with additional damping and stiffness in the fore-aft direction. Proportional action on the tower displacement with a zero reference input would introduce a steady-state rotor speed error. Therefore, a reference model 16 is employed to produce a non-zero reference trajectory representing the wind-induced tower displacement. In effect, the tower feedback loop 12 only provides stiffness against wave-induced tower displacements in a frequency range about the frequencies of significant turbulent wind variations. Typically, information about the tower displacements is not available with standard wind turbine measurements. In addition, the reference model requires information about the rotor wide effective wind speed, which cannot be measured directly. As such, a state estimator 15 is required in the tower feedback look 12 to determine (or estimate) these variables. A discrete-time extended Kalman filter is formulated to calculate the required state estimates.

A feedback controller 17 receives the outputs from the state estimator 15 and reference model 16, and feeds this back to the wind turbine 14 in combination with the output from the basic controller 13.

Thus, the tower feedback loop 12 operates in such a way that stiffness is only increased in response to wave induced motion (as opposed to wind-induced motion). This is because there will normally be a degree of wind-induced tower displacement—i.e. the tower will bend in the wind (and stay bent to some degree as long as the wind does not change). The state estimator 15 serves to estimate the tower motions and the reference model 16 provides a tower displacement value (which is not or cannot be directly measured) which can be subtracted so that the normal wind-induced displacement does not cause an error. Put simply, the tower feedback loop 12 determines what the wind turbine movements are relative to an actual bent position (caused by the wind) rather than relative to an upright position (which the tower may not necessarily be in).

However, this controller 10 is relatively complex and has various disadvantages as mentioned above.

The blade pitch controller 20 of the present invention, as illustrated in FIG. 3, provides a simplified and improved blade pitch controller compared with that illustrated in FIG. 2.

In the blade pitch controller 20, the nominal control system 11 is unchanged from that of FIG. 2. However, a new tower feedback loop 22 is provided, instead of the tower feedback loop 12 of the controller 10.

The tower feedback loop 22 contains a filtering system 25 instead of the state estimator 15 and reference model 16. The filtering system 25 comprises a high-pass filter and operates to provide additional effective stiffness to the wind turbine in response to all measured dynamic motion of the tower above the filter frequency of the high pass filter that is within the bandwidth of the blade pitch actuator, i.e. in response to both wave- and wind-induced motion. In contrast to this, the tower feedback loop 12 provides stiffness only to the wave-induced part of the dynamic motions of the tower 5.

As the filtering system 25 operates to provide additional effective stiffness to all measured dynamic motion of the tower above the filter frequency of the high pass filter that is within the bandwidth of the blade pitch actuator, this will exclude any influence due to the tower 5 bending due to a steady wind or gentle changes in the wind (zero or low frequency) but will act on motion caused by the relatively high frequency of waves hitting the tower 5.

The tower feedback loop 22 contains a feedback controller 17'. The structure of this feedback controller 17' is the same as that of the feedback controller 17 of FIG. 2. Their parameters could also be the same. However, typically, their parameters are not the same as (when) for the feedback controller 17' the motion sensors are located closer to the waterline than for the feedback controller 17.

The feedback controller 17' outputs a signal $\beta_{TFC}$, which is an additional blade pitch reference signal that is added to the nominal blade pitch reference signal $u_B$ from the basic controller 13.

The output $\beta_{TFC}$ from the feedback controller 17 can be expressed as:

$$\beta_{TFC} = -\frac{1}{F_A^\beta(\omega, \beta)}\left(K_P^x x_{f1} + K_D^x \dot{x}_{f2}\right). \tag{2}$$

where $K_P^x$ is the proportional gain, and $K_D^x$ is the derivative gain. $F_A^\beta(\omega,\beta)$ is implemented as an estimate of the derivative from pitch angle to aerodynamic thrust force:

$$F_A^\beta(\omega, \beta) = \frac{\partial F_A}{\partial \beta}\big|_{(\omega,\beta)} < 0, \tag{3}$$

where $\omega$ is the rotor speed and $\beta$ is the blade pitch angle.
Furthermore:
$\chi_{f1}$ is the filtered position measurement/estimate $\chi$, which could relate either to a translation (surge) or angular motion (pitch) in the nacelle direction. It could be measured directly or it could be calculated based on position, velocity and/or acceleration measurements.
$\dot{\chi}_{f2}$ is the filtered velocity measurement/estimate $\dot{\chi}$, which could relate either to a translation velocity or angular velocity in the nacelle direction. It could be measured directly or it could be calculated based on position, velocity and/or acceleration measurements.

The x direction with respect to the wind turbine is as indicated in FIG. 1.

Filtering is provided by the filtering system 25. Different filtering could be used on the position and velocity measurements and filtering may not be required at all on the $\dot{\chi}_{f2}$ measurement.

The filtering applied to the measurements $\chi$ and $\dot{\chi}$ could typically be:
Filtering the static and quasi-static motion (which will typically be low frequency wind-induced motion). This could be achieved with a second order Butterworth high-pass filter with Laplace transform:

$$h_{fa}(s) = \frac{s^2}{s^2 + \sqrt{2}\,\omega_{fa} s + \omega_{fa}^2}, \tag{1}$$

where $h_{fa}$ is the Laplace transform function, $\omega_{fa}$ is the high pass filter frequency in rad/s and s is the Laplace variable.
Filtering of the 3P frequency corresponding to the blade passing frequency of a three-bladed wind turbine (2P frequency for a two-bladed wind turbine). This could be achieved with a second order notch filter of the form:

$$h_{fb}(s) = \frac{s^2 + 2\zeta_n \omega_{fb} s + \omega_{fb}^2}{s^2 + 2\zeta_d \omega_{fb} s + \omega_{fb}^2}, \tag{4}$$

where $h_{fb}$ is the Laplace transform function and s is the Laplace variable. $\omega_{fb}$ is the notch filter frequency in rad/s and $\zeta_n$ and $\zeta_d$ are the relative damping in the nominator and denominator, respectively.

Conventional low-pass filtering (with a sufficiently high filter frequency) of possible high frequency noise/response could be required, for example by using a second order Butterworth low-pass filter.

Motion sensors (not shown) are provided on the wind turbine 1 to measure the position $\chi$ and the velocity $\dot{\chi}$. These sensors are advantageously located near or at the water line 8 (e.g. as opposed to being closer to/at the nacelle 4) in order to better capture wave-induced motion and less wind-induced noise such as the blade passing frequency effect. The platform deck (not shown) of an offshore wind turbine 1 could be a practical and advantageous location for such motion sensors.

Such selection of sensor location may then advantageously not require filtering of the 3P (or 2P) frequency, and one possible controlled configuration from equation (1) could be:

$$x_{f1}(s) = h_{f2}(s)x(s) \quad (5)$$

$$\dot{x}_{f2}(s) = \dot{x}_{(s)}, \quad (6)$$

where the high-pass filter frequency of $h_{fa}(s)$ could be selected as, for example:

$$\omega_{fa} = \frac{2\pi}{80} \text{rad/s}.$$

Figure 4:
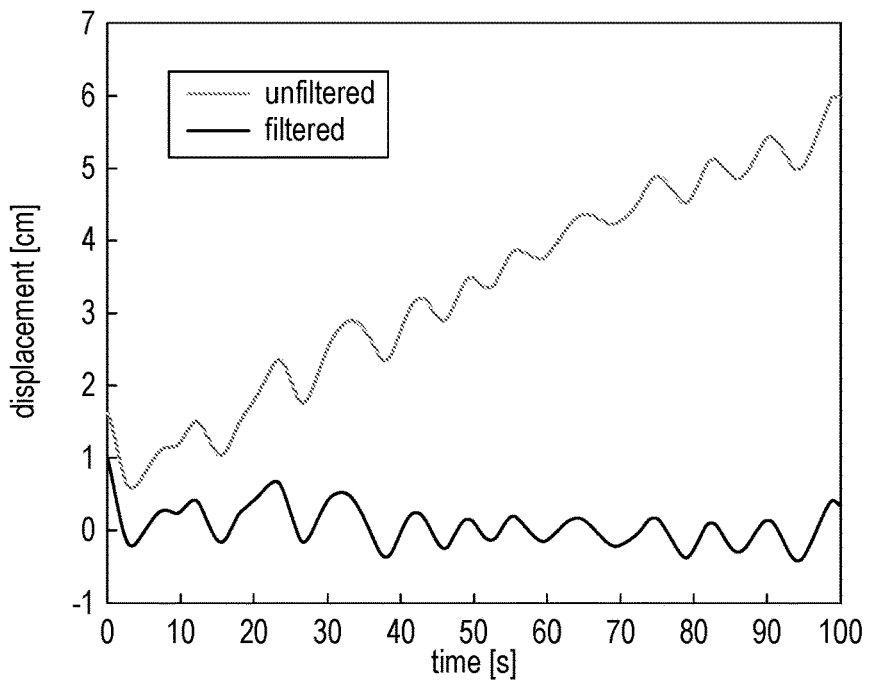
FIG. 4 is a graph comparing unfiltered signals and filtered signals according to an embodiment of the invention.

FIG. 4 is a graph of simulated data showing tower displacement plotted against time for an unfiltered signal $\chi$ (upper line) and a filtered signal $\chi_{f1}$ (lower line). The unfiltered signal contains wave frequency excitation as well as static and quasi-static wind frequency excitation. The filtered signal is based on equation (5) above with $$\omega_{fa} = \frac{2\pi}{80} \text{rad/s}.$$

As can be seen, the filtered signal shows an average displacement centred around zero whereas the unfiltered signal shows a displacement increasing with time.

The blade pitch controller 20 has a significantly simpler implementation compared to the prior art controller 10 of FIG. 2, whilst providing very similar results.

The table below presents a lifetime comparison of a "Basic" controller (i.e. the nominal control system 11) with the blade pitch controller 10 of FIG. 2 (labelled as "Advanced" in the table) and the blade pitch controller 20 of the present invention and shown in FIG. 3 (labelled as "Simplified" in the table). Eleven different controller performance comparison parameters are compared.

of tower feedback control. The results the sixth, seventh, and ninth result columns are undesirable effects of tower feedback control.

The controller performance comparison parameters that are assessed are defined as follows:

| Component | Performance parameter | Description | Desired trend |
|---|---|---|---|
| Support structure | $D_{Max}^{20}$ | Maximum fatigue damage | ↓ |
| | $D_{FA}^{20}$ | Fore-aft fatigue damage | ↓ |
| | $D_{SS}^{20}$ | Side-side fatigue damage | ↓ |
| Blade roots | $DEL_{Edge}^{20}$ | Edgewise equivalent fatigue load | ↓ |
| | $DEL_{Flap}^{20}$ | Flapwise equivalent fatigue load | ↓ |
| Pitch actuators | $DEL_\beta^{20}$ | Equivalent fatigue load in bearing | ↓ |
| | $ADC_\beta^{20}$ | Actuator duty cycle | ↓ |
| Drive-train | $DEL_{Gear}^{20}$ | Equivalent fatigue load in gearing | ↓ |
| | $DEL_{Shaft}^{20}$ | Equivalent fatigue load in the main shaft | ↓ |
| Generator | $P_{Out}^{20}$ | Lifetime energy yield | ↑ |
| | $IAE_\omega^{20}$ | Intergrated absolute generator speed error | ↓ |

Figure 5:
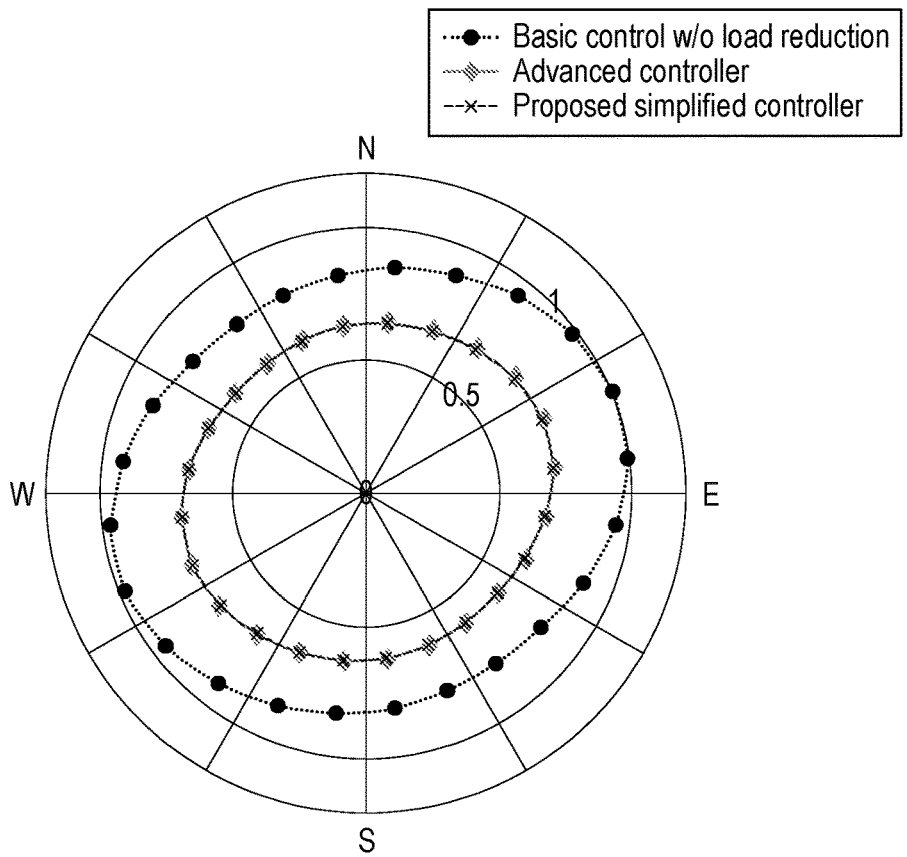
FIG. 5 is a lifetime comparison plot of the accumulation of fatigue damage in the wind turbine foundation.
Figure 6A:
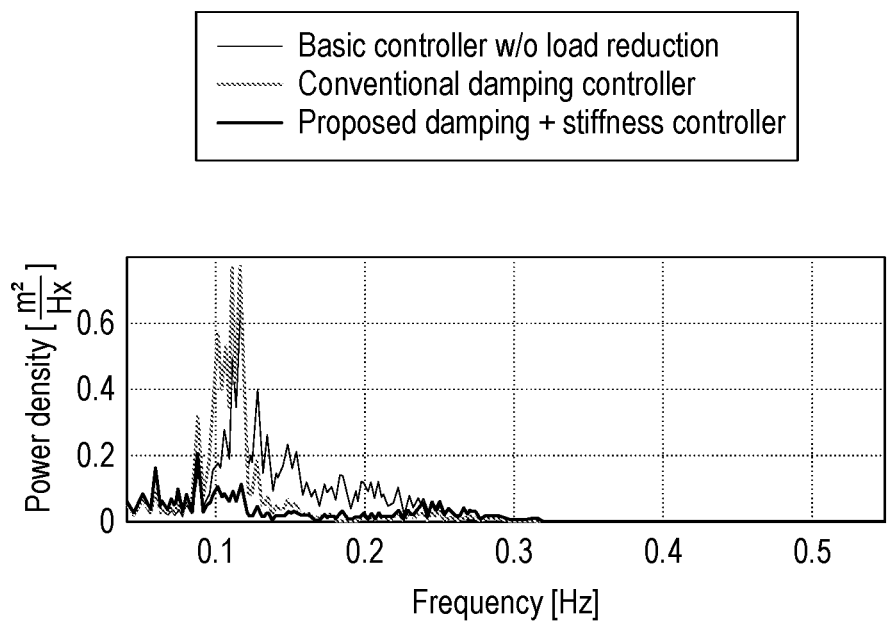
FIGS. 6a-d are plots showing the results of a simulation illustrating the effectiveness of a blade pitch controller according to the invention compared with conventional damping control.
Figure 6B:
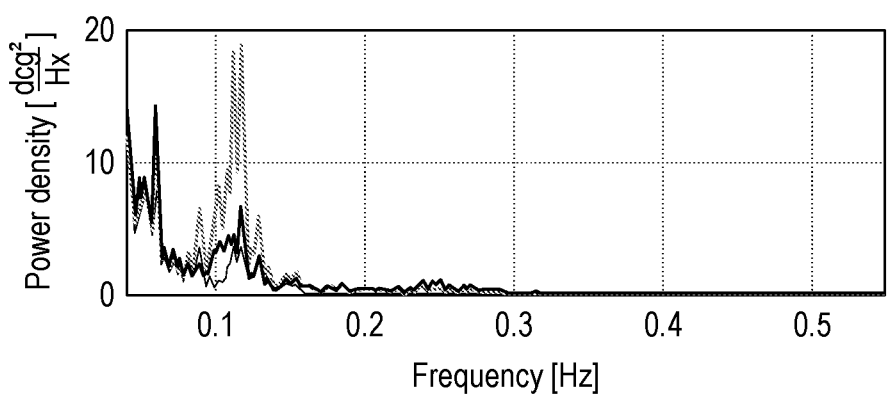
Figure 6C:
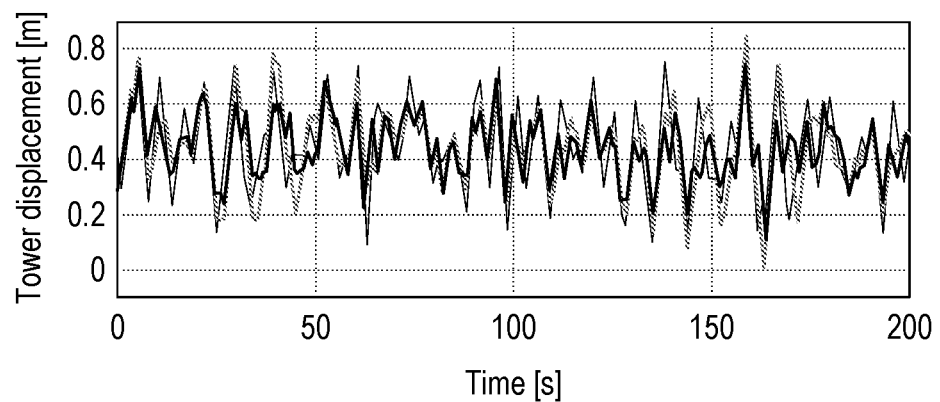
Figure 6D:
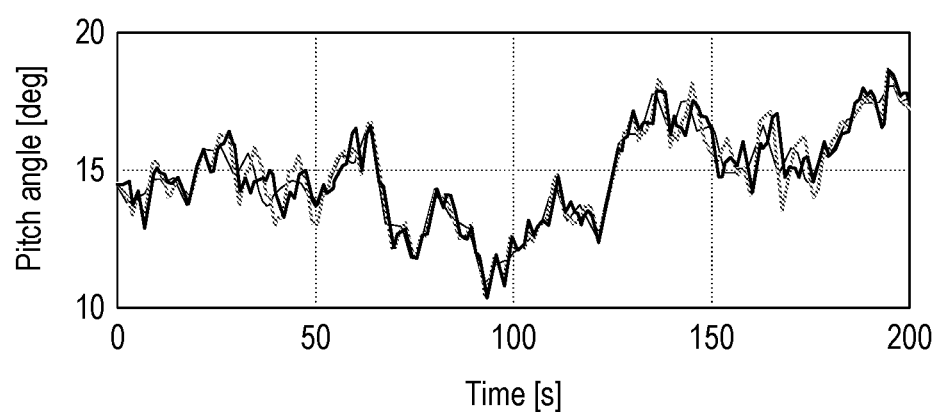

FIG. 5 presents a lifetime comparison of the accumulation of fatigue damage in the wind turbine foundation with the blade pitch controller 20 of the present invention (labelled as "Proposed simplified controller) compared with the prior art blade pitch controller 10 of FIG. 2 (labelled as "Advanced controller") and the nominal control system 11 (labelled as "Basic control w/o [without] load reduction"). As can been seen, the blade pitch controller 20 of the present invention provides similar performance in terms of fatigue reduction as the prior art blade pitch controller 10 of FIG. 2.

The results of a simulation illustrating the effectiveness of the blade pitch controller 20 of the present invention compared to conventional damping control are presented in FIGS. 6*a-d*. In these graphs, the black line represents the blade pitch controller 20 of the present invention (labelled as "Proposed damping+stiffness controller), the blue line represents a prior art conventional damping controller (labelled as "Conventional damping controller"), and the red line represents using just the nominal control system 11 (labelled as "Basic controller w/o [without] load reduction").

FIG. 6(*a*) is a plot of power density measured in m²/Hz as a function of frequency, showing power spectral density of the tower top displacement.

FIG. 6(*b*) is a plot of power density measured in deg²/Hz as a function of frequency, showing power spectral density of the blades' pitch angle.

FIG. 6(*c*) is a plot of tower top displacement as a function of time.

| Controller | $D_{Max}^{20}$ | $D_{FA}^{20}$ | $D_{SS}^{20}$ | $DEL_{Edge}^{20}$ | $DEL_{Flap}^{20}$ | $DEL_\beta^{20}$ | $ADC_\beta^{20}$ | $DEL_{Gear}^{20}$ | $DEL_{Shaft}^{20}$ | $P_{Out}^{20}$ | $IAE_\omega^{20}$ |
|---|---|---|---|---|---|---|---|---|---|---|---|
| Basic | 100.0 | 100.0 | 100.0 | 100.0 | 100.0 | 100.0 | 100.0 | 100.0 | 100.0 | 100.0 | 100.0 |
| Advanced | 71.5 | 71.6 | 87.0 | 95.70 | 95.0 | 110.3 | 146.2 | 100.2 | 105.5 | 100.0 | 101.7 |
| Simplified | 72.2 | 71.8 | 88.6 | 95.3 | 94.9 | 110.8 | 148.4 | 100.4 | 108.0 | 100.0 | 101.6 |

All performance comparison parameters show that the simplified controller (blade pitch controller 20 of the present invention) yields similar performance as the advanced controller (prior art blade pitch controller 10 of FIG. 2). The results in the first five results columns are desirable effects FIG. 6(*d*) is a plot of the blades' collective pitch angle as a function of time.

From these plots, it can be seen that both tower motion and the blades' pitch activity are significantly increased in a frequency range around 0.1 Hz with the prior art conventional damping controller. However, the blade pitch controller 20 of the present invention (proposed damping+stiffness controller) eliminates this undesirable behaviour.

The blade pitch controller 20 of the present invention (proposed damping+stiffness controller) could also provide additional stiffness for excitation mechanisms other than waves, if their excitation frequency is above the selected high pass filter frequency and within the bandwidth of the blade pitch actuator (and outside the notch filter frequency area if this is applied).

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

REFERENCES

1. Van der Hooft E, Schaak P, Van Engelen T. Wind turbine control algorithms. *DOWEC project-DOWEC-F1W1-EH-03-094/0, Task-3 report* 2003. (Van der Hooft, 2003)
2. Bossanyi E. Wind turbine control for load reduction. Wind Energy 2003; 6(3):229-244. (Bossanyi, 2003)
3. Smilden E, Bachynski E E, Sorensen A J, Amdahl J. Wave disturbance rejection for monopile offshore wind turbines. Wind Energy 2018. https://doi.org/10.1002/we.2273. (Smilden, 2018).

We claim:

1. A blade pitch controller for a wind turbine, wherein the wind turbine comprises an elongate tower with a nacelle and a rotor attached to the upper end of the tower, the rotor comprising a plurality of blades, wherein the blade pitch controller comprises a nominal control system arranged to control the blade pitch of the wind turbine in order to optimise power production and a tower feedback loop, wherein the tower feedback loop comprises a filtering system and a feedback controller, wherein the filtering system is arranged to receive at least one of position and velocity measurements or estimates of the wind turbine as input and to output at least one of filtered position and velocity measurements or estimates of the wind turbine, and the feedback controller is arranged to receive at least one of the output filtered position and velocity measurements or estimates of the wind turbine from the filtering system and to output a blade pitch reference signal determined from at least one of the filtered position and velocity measurements or estimates of the wind turbine to the nominal control system, such that the tower feedback loop is arranged to control wind turbine blade pitch so as to provide additional effective stiffness to the wind turbine in response to motion of the wind turbine above a filter frequency of the filtering system.

2. A blade pitch controller as claimed in claim 1, wherein the filtering system comprises one or more of a high-pass filter, a low-pass filter and a notch filter.

3. A blade pitch controller as claimed in claim 2, wherein the filter frequency of the filtering system is the filter frequency of the high-pass filter.

4. A blade pitch controller as claimed in claim 1, wherein the tower feedback loop is arranged to control wind turbine blade pitch so as to provide additional effective stiffness to the wind turbine in response to both wave- and wind-induced motion of the wind turbine; and/or in response to motion of the wind turbine within a bandwidth of a blade pitch actuator.

5. A blade pitch controller as claimed in claim 1, wherein at least one of position and velocity measurements and estimates of the wind turbine are provided as input to the filtering system.

6. A blade pitch controller as claimed in claim 5, wherein at least one of the position and velocity measurements and estimates are provided from one or more sensors located on a tower or foundation of the wind turbine.

7. A blade pitch controller as claimed in claim 6, wherein the one or more sensors are located at or near a water line on the wind turbine.

8. A blade pitch controller as claimed in claim 1, wherein the filtering system is arranged to output at least one of filtered position and velocity measurements and estimates of the wind turbine.

9. A blade pitch controller as claimed in claim 1, wherein the filtering system is arranged to filter position and velocity measurements and estimates of the wind turbine differently.

10. A blade pitch controller as claimed in claim 1, wherein the filtering system is arranged to filter out at least one of static and quasi-static motion; and motion at a blade passing frequency.

11. A blade pitch controller as claimed in claim 1, wherein the tower feedback loop further comprises a feedback controller.

12. A blade pitch controller as claimed in claim 11, wherein the feedback controller is arranged to determine a blade pitch reference signal from at least one of filtered position and velocity measurements and estimates of the wind turbine output from the filtering system.

13. A method of controlling blade pitch of a wind turbine, the method comprising using a blade pitch controller with a with a filtering system as defined in claim 1 to control the blade pitch by determining a blade pitch reference signal from at least one of filtered position and velocity measurements or estimates of the wind turbine, and adjusting the blade pitch based on the blade pitch reference signal, so as to provide additional effective stiffness to the wind turbine in response to motion of the wind turbine above a filter frequency of the filtering system.

14. A method as claimed in claim 13, the method comprising controlling wind turbine blade pitch so as to provide additional effective stiffness to the wind turbine in response to both wave- and wind-induced motion of the wind turbine.

15. A method as claimed in claim 13, the method comprising controlling wind turbine blade pitch so as to provide additional effective stiffness to the wind turbine in response to motion of the wind turbine within a bandwidth of a blade pitch actuator.

16. A method as claimed in claim 13, the method comprising using the filtering system to filter at least one of position and velocity measurements and estimates of the wind turbine.

17. A method as claimed in claim 13, the method comprising at least one of:
   filtering position and velocity measurements or estimates of the wind turbine differently;
   filtering out at least one of static and quasi-static motion; and
   filtering out motion at a blade passing frequency.

18. A wind turbine comprising a blade pitch controller as claimed in claim 1.

19. A tower feedback controller for a blade pitch controller for a wind turbine, wherein the wind turbine comprises an elongate tower with a nacelle and a rotor attached to the upper end of the tower, the rotor comprising a plurality of blades, wherein the tower feedback controller comprises a filtering system, wherein the filtering system is arranged to receive at least one of position and velocity measurements or estimates of the wind turbine as input and to output at least one of filtered position and velocity measurements or estimates of the wind turbine, and the feedback controller is arranged to receive at least one of the output filtered position and velocity measurements or estimates of the wind turbine from the filtering system and to output a blade pitch reference signal determined from at least one of the filtered position and velocity measurements or estimates of the wind turbine to a nominal control system arranged to control the blade pitch of the wind turbine in order to optimise power production, such that the filtering system is arranged to control wind turbine blade pitch so as to provide additional effective stiffness to the wind turbine in response to motion of the wind turbine above a filter frequency of the filtering system.

\* \* \* \* \*